United States Patent
Lampe-Juergens et al.

(10) Patent No.: US 11,761,807 B2
(45) Date of Patent: Sep. 19, 2023

(54) GAS METER ARCHITECTURE

(71) Applicant: Honeywell International Inc., Charlotte, NC (US)

(72) Inventors: Christian Lampe-Juergens, Spelle (DE); Tobias Meimberg, Osnabrück (DE); Ralf Schroeder Genannt Berghegger, Glandorf (DE); Andreas Wuchrer, Georgsmarienhütte (DE); Norbert Flerlage, Löningen (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 332 days.

(21) Appl. No.: 17/108,297

(22) Filed: Dec. 1, 2020

(65) Prior Publication Data
US 2022/0170774 A1    Jun. 2, 2022

(51) Int. Cl.
*G01F 7/00* (2006.01)
*G01D 4/00* (2006.01)
(Continued)

(52) U.S. Cl.
CPC ............. *G01F 7/005* (2013.01); *G01D 4/004* (2013.01); *H04W 4/80* (2018.02); *H04W 84/04* (2013.01)

(58) Field of Classification Search
CPC .......... G01F 7/005; G01F 1/667; G01F 1/668; H04W 4/80; H04W 84/04; F17D 3/01;
(Continued)

(56) References Cited

U.S. PATENT DOCUMENTS

| 4,918,995 A | 4/1990 | Pearman et al. |
| 8,994,552 B2 | 3/2015 | Jiang et al. |

(Continued)

FOREIGN PATENT DOCUMENTS

| KR | 20110022877 A | 3/2011 |
| KR | 1153173 B1 | 7/2012 |

(Continued)

OTHER PUBLICATIONS

AC-250NX Diaphragm Meter, Honeywell International, Nebraska, 4 pages, 2019.
(Continued)

*Primary Examiner* — Francis C Gray
(74) *Attorney, Agent, or Firm* — Seager, Tufte & Wickhem, LLP

(57) ABSTRACT

Devices, methods, and systems for operating gas meters are described herein. The systems may include a gas meter connectable to a gas line, where the gas meter may have a metrology unit in communication with a flow of gas through the gas line and an index unit in communication with and releasably coupled to the metrology unit. The metrology unit may be configured to generate flow rate data of the flow through the gas line based on outputs from a flow rate sensor, generate gas temperature data based on outputs from a temperature sensor, compensate the flow rate data based on the temperature data, generate an average flow rate, and output the average flow rate data to the index unit. The index unit may generate gas volume data based on flow rate data received from the metrology unit.

18 Claims, 5 Drawing Sheets

(51) Int. Cl.
*H04W 4/80* (2018.01)
*H04W 84/04* (2009.01)

(58) Field of Classification Search
CPC .. G01D 4/004; G01D 3/0365; G01D 2204/14; G01D 2204/26
See application file for complete search history.

(56) References Cited

U.S. PATENT DOCUMENTS

| | | | |
|---|---|---|---|
| 9,355,477 B2 | 5/2016 | Ashley et al. | |
| 9,366,595 B2 | 6/2016 | Bourgeois | |
| 9,441,987 B2 * | 9/2016 | Cornwall | F17D 5/02 |
| 9,557,899 B2 | 1/2017 | McGreevy et al. | |
| 10,533,882 B2 | 1/2020 | Iliev et al. | |
| 10,571,358 B2 | 2/2020 | Campan et al. | |
| 10,663,333 B2 | 5/2020 | Iliev | |
| 2013/0013261 A1 | 1/2013 | Niessen et al. | |
| 2013/0340519 A1 * | 12/2013 | Kurth | G01F 7/00 73/196 |
| 2014/0116129 A1 * | 5/2014 | Yang | G01F 1/6842 73/204.22 |
| 2014/0137643 A1 * | 5/2014 | Henry | G01F 1/845 73/152.31 |
| 2015/0276433 A1 | 10/2015 | Brahmajosyula et al. | |
| 2018/0088599 A1 * | 3/2018 | Iliev | G01D 4/004 |
| 2018/0316987 A1 | 11/2018 | Artiuch et al. | |
| 2018/0347759 A1 * | 12/2018 | Huang | A61M 16/16 |
| 2020/0182654 A1 * | 6/2020 | Kawauchi | G01D 4/004 |

FOREIGN PATENT DOCUMENTS

| | | | | |
|---|---|---|---|---|
| RU | 2545358 C2 * | 3/2015 | | G01F 1/662 |
| WO | 2007037616 A1 | 4/2007 | | |
| WO | 2013156945 A1 | 10/2013 | | |

OTHER PUBLICATIONS

Mass Flow Meter and Controller, Pressure Controller Red-y Smart Series, Vötglin Instruments AG—Switzerland, 56 pages, 2019.
Maquette Dialogaz II, Notice Utilsateur, Landis and Gyr, 14 pages, 1996.
Red-y Compact 2 Series, En A1-8, Votglin Instruments, AG—Switzerland, 47 pages, 2016.
Red-y Compact Series Operating Instructions, Votglin Instruments AG, Switzerland, 41 pages, 2015.
Smart Metering Implementation Progamme, Version 1.1, Department of Energy and Climate Change, Crown , 59 pages, 2014.

* cited by examiner

GAS METER ARCHITECTURE

TECHNICAL FIELD

The present disclosure relates generally to gas meters, and more particular to gas meter architecture.

BACKGROUND

The metrology unit in a residential and commercial gas meter is expected to have a useful life of twenty (20) to thirty (30) years. In recent years, smart gas meters have become increasing popular. Smart gas meters typically include hardware that facilitates communication with an external device or system. This hardware often requires a power source, such as an on-board battery. The battery must typically be replaced periodically. Tracking and replacing batteries in gas meters that are distributed across a gas distribution network can be a time consuming and expensive process for the gas utility.

In addition, the communication protocol of the communication infrastructure supporting the smart meter will likely change well before the useful life of the metrology unit is reached. To remain current with the advances in the communication infrastructure, the gas meters will likely need to be replaced well before the useful life of the metrology unit is reached. This may require disconnecting the existing gas meter from the gas supply line and installing a new compatible gas meter in its place. This can be time consuming and expensive for the utility, and can be inconvenient for the end user.

SUMMARY

The present disclosure relates generally to gas meters, and more particular to a gas meter architecture. In one example architecture, a gas meter includes a metrology unit and an index unit. The index unit may be releasably and communicatively coupled to the metrology unit, and may include communication hardware that supports communication with a communication infrastructure. Moreover, and in some cases, the metrology unit measures flow rate data, compensates the flow rate data based on temperature (though, this is not required) and stores an average flow rate of one or more periods of time. In some cases, the flow rate data and/or average flow rate data is communicated to the index unit upon request. In some cases, the metrology unit does not calculate gas volume data from the flow rate data. Instead, the index unit calculates the gas volume data. In other cases, the index unit simply communicates the flow rate data to a remote server or the like via the communication infrastructure, and the remote server calculates the gas volume data from the flow rate data. These are just examples.

In one particular example, a method, such as a method of using a gas meter, may be provided. This illustrative method may include generating, at a metrology unit of a gas meter, flow rate data of a gas flow based on readings from a flow rate sensor of the metrology unit. Further, at the metrology unit, gas temperature data of the gas flow may be generated based on readings from a gas temperature sensor of the metrology unit. The illustrative method may further include generating, at the metrology unit, an average flow rate over a predetermined period of time based at least in part on the flow rate data. Although not required, temperature compensated flow rate data may be utilized to determine an average temperature compensated flow rate. The average flow rate over the predetermined period of time may be outputted via an output port of the metrology unit. In some cases, the average flow rate may be communicated to an index unit that is releasably coupled to the metrology unit via the output port.

In another particular example, a method, such as a method of using a gas meter, may be provided. This illustrative method may include generating, at a metrology unit of a gas meter, flow rate data of a gas flow based on readings from a flow rate sensor of the metrology unit, and generating, at the metrology unit, gas temperature data of the gas flow based on readings from a gas temperature sensor of the metrology unit. The illustrative method may further include temperature compensating, at the metrology unit, the flow rate data using the gas temperature data to produce temperature compensated flow rate data, and generating, at the metrology unit, an average flow rate over a predetermined period of time based at least in part on the temperature compensated flow rate data. The average flow rate over the predetermined period of time may be outputted via an output port of the metrology unit. In some cases, the average flow rate may be communicated to an index unit that is releasably coupled to the metrology unit via the output port.

In another example, a method may include generating, at a metrology unit of a gas meter, flow rate data of a gas flow based on readings from a flow rate sensor of the metrology unit, and outputting, via an output port of the metrology unit, at least some of the flow rate data to an index unit of the gas meter, wherein the index unit is releasably coupled to the metrology unit. The method may further include converting, via the index unit, at least some of the flow rate data received from the metrology unit to gas volume data, and communicating, via the index unit, at least some of the gas volume data over a wide area network.

In another example, a system may include a first unit and a second unit releasably and communicatively coupled to the first unit. The second unit may be configured to communicate with a remote unit. The first unit may include a flow tube, a sensing device, and a controller. The flow tube may be configured to receive a flow from a flow line. The sensing device may be in communication with the flow in the flow tube, and the controller may be in communication with the sensing device. The first unit may be configured to determine one or more values related to flow rate of the flow through the flow tube based on an output of the sensing device, and provide a value of the one or more values related to flow rate to the second unit upon request.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE DRAWINGS

The disclosure may be more completely understood in consideration of the following description of various examples in connection with the accompanying drawings, in which.

DESCRIPTION

Figure 1:
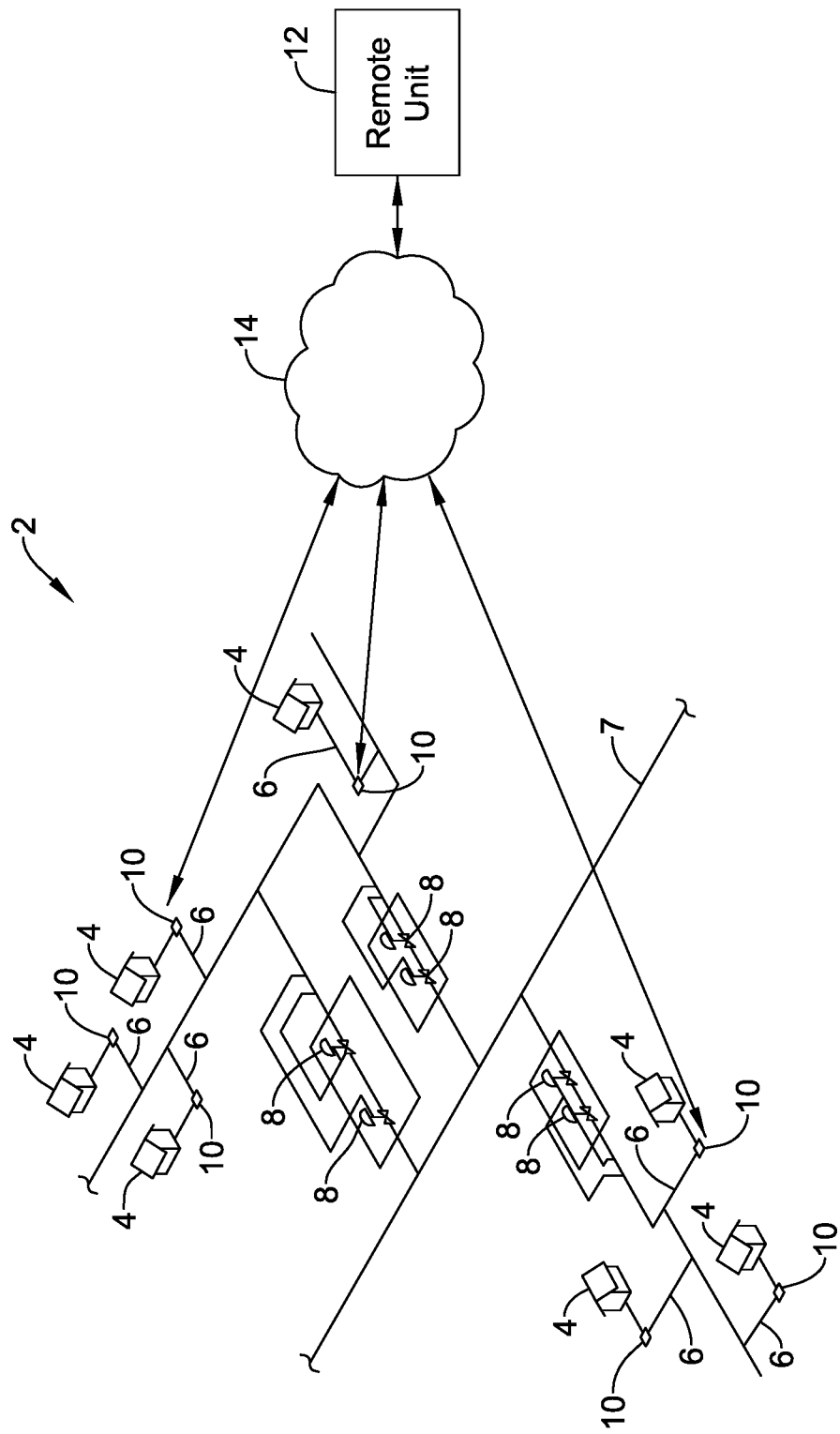
FIG. 1 is a schematic diagram of an illustrative gas metering system.

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

Commercial and residential gas meters are intended to last many years. For example, in Europe, installed gas meters may have a useful life of at least twenty (20) years and in the US, installed gas meters may have a useful life of at least thirty (30) years. Typical smart gas meters may have communication hardware and software configured to allow the smart gas meters to communicate over one or more wide area networks (WANs), local area networks (LANs), home area networks (HANs), and/or other suitable types of networks. As technology advances, the communication hardware and/or software of the smart gas meters may require updating and/or replacing.

In some cases, gas meters may include metrology measurements and databases of the metrology measurements, along with communication systems, power management systems, and user interfaces. As gas meters may include communication systems and metrology units, it may be costly and time consuming to replace an entire gas meter when communication hardware and/or software needs to be updated to facilitate communication using updated standards and/or protocols due to having to purchase new communication and metrology components of the gas meter, schedule and pay a technician to replace the gas meter, save any data on the gas meter being replaced, reload the data on the new gas meter, etc. Additionally, replacing an entire gas meter may require a disconnect from a gas line for an end user, which is undesirable.

It may be desirable to have a smart gas meter that includes an indexing unit configured to include components facilitating communicating over one or more LANs, WANs, and/or HANs and a metrology unit that is releasably connected to the indexing unit and that is configured to sense measurements of a flow passing through a gas line and communicate data related to sensed measurements to the indexing unit. Such a configuration may facilitate replacing or updating the communication hardware and/or software and/or other suitable components of the indexing unit in the field, in an efficient manner without losing data obtained at the metrology unit/components and/or without losing a connection to the gas line.

To facilitate separating indexing or communication components from metrology components and operating in a power-conscious manner, a metrology unit may be configured to measure and/or determine one or more values related to flow rate through the gas line without making calculations of volume values. In such a configuration, the metrology unit may obtain flow rate data from a sensor system sensing characteristics of a flow through a gas line, may correct the flow rate data with one or more sensed and/or received gas condition values (e.g., temperature values, pressure values, etc.), and may accumulate corrected flow rate data over a predetermined time period to obtain averaged corrected flow rate data, some or all of which may be stored in memory at the metrology unit. As further described herein, the indexing unit may receive the corrected flow rate data and calculate volume values based on the corrected flow rate data. Utilizing a metrology unit and an indexing unit in this manner may facilitate using less energy (e.g. battery power) and/or processing power at the metrology unit due to fewer calculations needed. Moreover, accurate flow rate information from the metrology unit may allow for accurate flow rate profile analyses by the indexing unit and/or other suitable computing devices.

Turning to the Figures, FIG. 1 depicts an illustrative gas meter system 2 implemented in a residential setting having one or more houses 4. Near each house, a gas meter 10 may be installed to measure the quantity of gas consumed by that house, often for billing purposes. In some cases, a regulator may be installed near the gas meter 10 to reduce or limit a pressure in a gas line 6 feeding the house 4. One or more regulator stations 8 may be located upstream of the gas meters 10 as shown.

The gas line 6 may be configured to connect the gas meter, the regulators, and/or the regulator station. As depicted in FIG. 1, the gas line 6 may include an upstream main gas line 7 that feeds one or more regulator stations 8. The regulator stations 8 then feed one or more downstream regulators and/or gas meters 10 at each house 4. This is just one illustrative configuration.

In some cases, the gas meter system 2 may include a remote unit 12 (e.g., a head-end system and/or other suitable remote unit), which may be in communication with the gas meters 10, the regulators, and/or the regulator stations 8 over one or more networks 14 (e.g., LANs, WANs, HANs, etc.). The remote unit 12 may be hardware and/or software that receives data from the gas meters 10 and/or other components of the gas meter system 2. Although not required, the remote unit 12 may be located at a gas utility and/or at one or more other suitable locations. In some cases, the remote unit 12 may perform data analysis and/or push received data to one or more other systems and/or components.

Figure 3:
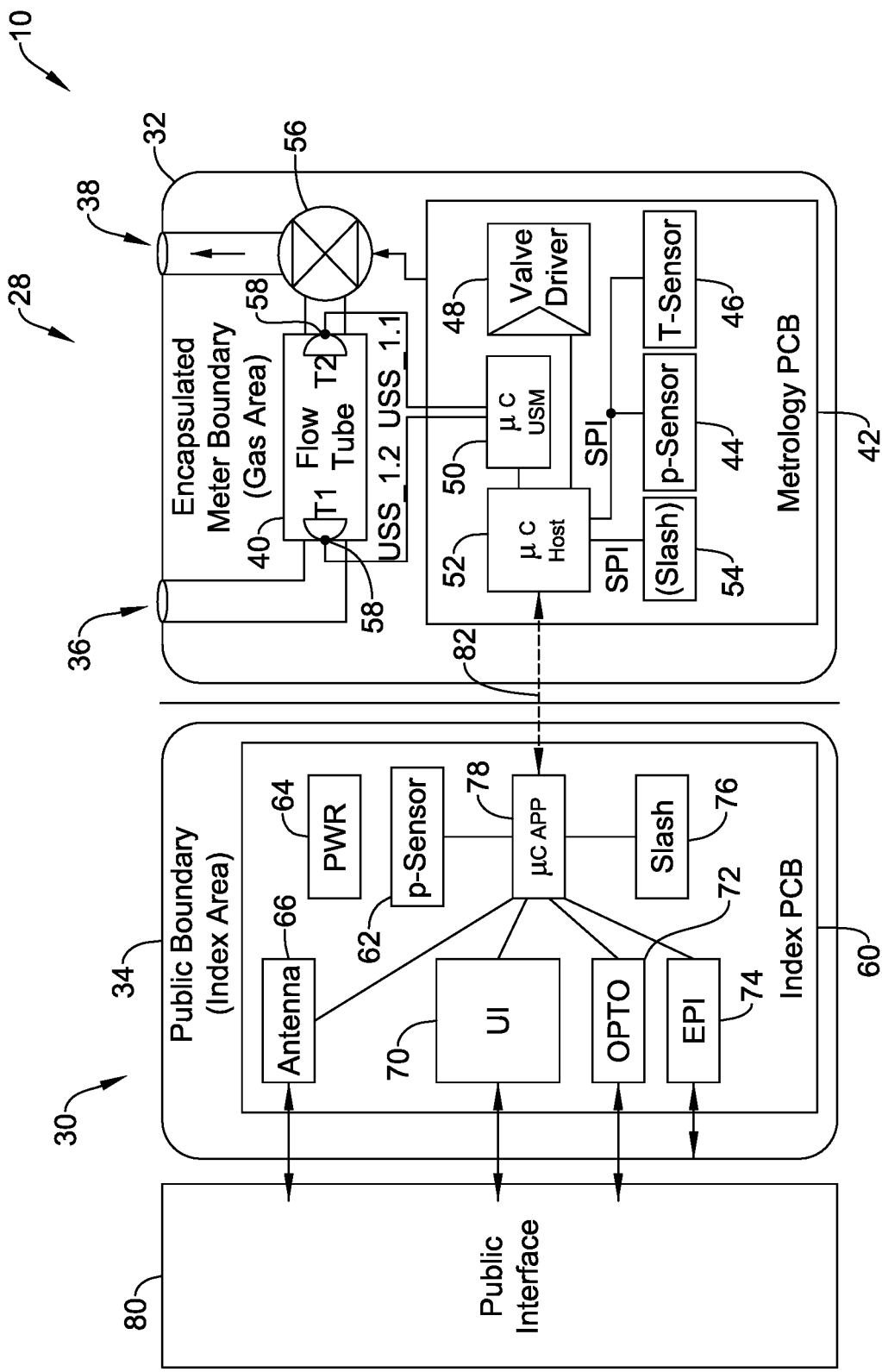
FIG. 3 is a schematic block diagram of an illustrative gas meter system.

The gas meter 10 may be configured in any suitable manner. In some cases, the gas meter 10 may include one or more pressure sensors (e.g., absolute pressure sensors and/or other suitable pressure sensors). In an example configuration, one of the pressure sensors may be in an electronic index (e.g., as shown in FIG. 3 and discussed below), while the other pressure sensor may be within a metrology unit of the gas meter 10 that is connectable to the electronic index. The gas meter 10 may calculate a pressure difference between the two pressure sensors when both are included to obtain a current net pressure within the gas meter 10. Typically, the net pressure within the gas meter 10 may be in a range of about twenty (20) millibars (mbar) to thirty (30) mbar (e.g. 0.3 pressure per square inch (PSI) to forty-five (0.45) PSI).

The gas meter 10 may be able to measure flow rate of a flow through the gas line 6. The flow rate may be calculated using a delta time of flight measurement and/or calculated in one or more other suitable manner. For example, a delta time of flight may be determined from:

$$\Delta T = T_{21} - T_{12} = \frac{2Lv}{(c^2 - v^2)} \quad (1)$$

Where $\Delta T$ is the delta time of flight between an upstream location and a downstream location, $T_{21}$ is an absolute time of flight from a second point (e.g., a second transducer) to a first point (e.g., a first transducer) (see FIG. 3), $T_{12}$ is an absolute time of flight from the first point to the second point, L is a length from the first point to the second point, v is a speed of travel of the flow, and c is a speed of sound of the measured fluid. These time of flights may be determined using an ultrasonic measuring unit (USM) or the like. From the delta time of flight, $\Delta T$, the speed, v, of the flow may be calculated:

$$V = \frac{L}{2}\left(\frac{\Delta T}{T_{21}T_{12}}\right) \quad (2)$$

Using the speed of the flow, a volumetric flowrate, Q, of the flow may be calculated:

$$Q = v*A \quad (3)$$

where A is a cross-sectional area of a flow tube in which the flow that is being measured flows (e.g. flow tube of the USM).

In some cases, the gas meter 10 may be configured to calculate a speed of sound in the gas (e.g., an absolute time of flight measurement and/or other suitable time of flight calculation) to be used in the delta time of flight measurement shown in equation (1). The speed of sound may depend on the gas, air, or a combination of gas and air inside the gas meter 10. The speed of sound for air is about 340 meters (m)/second (s). The speed of sound for methane is about 430 m/s. As such, a composition of both air and methane may have a speed of sound between 340 m/s and 430 m/s depending on the concentrations of the composition. Based on such information and/or other suitable information, the gas meter 10 may determine its internal net pressure and flow rate of the flow in the gas line 6.

Figure 2:
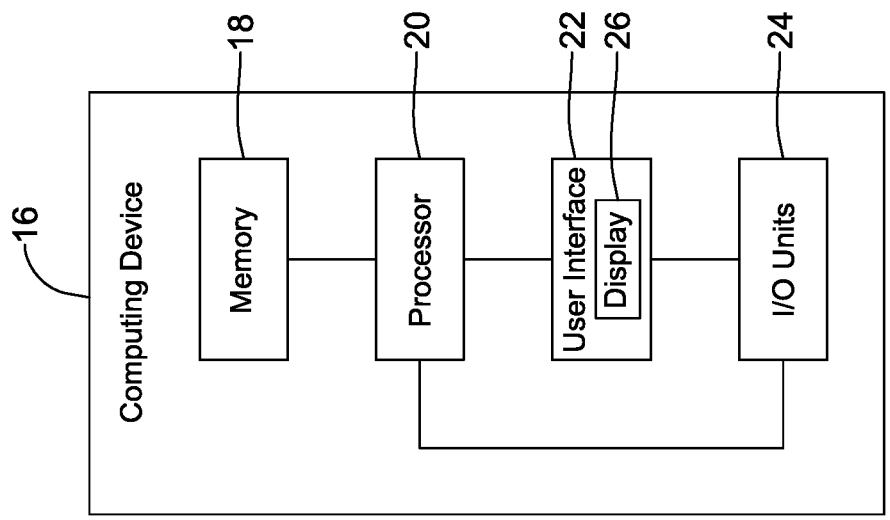
FIG. 2 is a schematic block diagram of an illustrative computing device.

The gas meter 10, the remote unit 12 and/or other suitable computing components of the gas meter system 2 may be and/or may include one or more computing devices. FIG. 2 depicts a schematic diagram of an illustrative computing device 16. The computing device 16 may represent all or part of one or more of the regulator station 8, the gas meter 10, the remote unit 12, the network 14, and/or one or more other computing device components of or associated with the gas meter system 2. Although not shown, the computing device 16 may include a clock and/or a timer. The computing device 16 may be and/or may be part of, for instance, a smart phone, a tablet, a personal digital assistant (PDA), a personal computer, a motor, a network device, a light source, a controller, a sensor, a switch, a remote server, a network device, a router, a modem, and/or other suitable computing device. However, configurations of the present disclosure are not limited to a particular type of computing device 16. In some cases, the computing device 16 may include memory 18, one or more processors 20, one or more user interfaces 22, one or more input/output (I/O) units 24, and/or one or more other suitable computing components.

The memory 18 may be any type of storage medium that can be accessed by the processor 20 to perform various examples of the present disclosure. For example, the memory 18 may be a non-transitory computer readable medium having computer readable instructions (e.g., computer or application program instructions, application program code of a mobile application or software, control algorithm software, and/or other suitable instructions) stored thereon that are executable by the processor 20 for performing one or more methods described herein.

The memory 18 may be volatile or nonvolatile memory. The memory 18 may also be removable (e.g., portable) memory, or non-removable (e.g., internal) memory. For example, the memory 18 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although the memory 18 is illustrated as being located in the computing device 16, embodiments of the present disclosure are not so limited. For example, the memory 18 may also be located internal to another computing resource (e.g., enabling computer readable instructions to be downloaded over the Internet or another wired or wireless connection).

The processor 20 of the computing device 16 may include a single processor or more than one processor working individually or with one another (e.g., dual-core, etc.). The processor 20 may be configured to execute instructions, including instructions that may be loaded into the memory 18 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The user interface 22, when provided, may be any suitable user interface and/or user interface components configured to facilitate a user of the computing device 16 interacting with the computing device 16 via the user interface 22. For example, the user interface 22 may be used to provide information to and receive information from the user of the computing device 16. For instance, the user interface 22 may display volume data, flow rate data, and/or other suitable data related to a flow through a gas line and/or receive selections of settings for sensing and/or monitoring a flow through the gas line. The user interface 22 may include a keyboard or keyboard functionality, a pointer (e.g., a mouse, touch pad, or touch ball) or pointer functionality, a microphone, a speaker, a light system, a haptic system, a camera, a video camera, selectable buttons, adjustable dials, and/or other suitable user interface features the user may use to input information into and/or receive information from the computing device 16. Configurations of the present disclosure, however, are not limited to a particular type(s) of user interface 22.

In some cases, the user interface 22 may include a graphical user interface (GUI) that may have a display 26 (e.g., a screen) that may provide and/or receive information to and/or from the user of the computing device 16. The display 26 may be, for instance, a touch-screen (e.g., the GUI may include touch-screen capabilities). In some cases, the user interface may be part of another device (e.g. cell phone) that is in wireless communication with the computing device 16.

The I/O unit 24 may be and/or include any type of communication port(s) and may facilitate wired and/or wireless communication with one or more networks. In one example, the I/O unit 24 may facilitate communication with one or more networks and/or other devices through any suitable connection including, but not limited to, radio communication, Ethernet, cellular communication, ZigBee, REDLINK™, Bluetooth, Bluetooth Low Energy (BLE), WiFi, IrDA, dedicated short range communication (DSRC), EnOcean, Near Field Communication (NFC), and/or any other suitable common or proprietary wired or wireless protocol. In one example, the I/O unit 24 may at least include a port configured to communicate over the network 14 with one or more components of or in communication with the gas meter system 2.

FIG. 3 is a schematic diagram of an illustrative gas meter 10. The gas meter 10 may include a metrology unit 28 (e.g., a first unit) and an index unit 30 (e.g., a second unit). In some cases, the index unit 30 may be in communication with the metrology unit 28 unit and may be releasably connected (e.g., releasably mechanically connected and/or releasably electrically connected) to the metrology unit 28. The communication connection between the metrology unit 28 and the index unit 30 may be a wired and/or wireless connection. In some cases, a metrology housing 32 may entirely or at least partially define an encapsulated meter boundary.

The gas meter 10 may include a single housing or two or more housings. In one example, as depicted in FIG. 3, the gas meter 10 may include the metrology housing 32 configured to at least partially house all or at least one of the components of the metrology unit 28 and an index housing 34 configured to at least partially house all or at least one of the components of the index unit 30.

The metrology unit 28 may include an inlet 36 for receiving a flow from a gas line (e.g., the gas line 6 and/or other suitable gas line) and an outlet 38 for returning the flow to the gas line. A flow tube 40 may extend at least partially between the inlet 36 and the outlet 38 and receive the flow. Although not required, the flow tube 40 may facilitate sensing pressures and/or flow rates of the flow through the gas line (e.g., by sampling the flow of the gas line through the flow tube 40).

The metrology unit 28 may include one or more metrology printed circuit boards (PCBs) 42 in communication with one or more electronic components of the metrology unit 28. For example, the metrology PCB 42 may include and/or be in communication with a metrology pressure sensor 44, a metrology temperature sensor 46, a valve driver 48, an ultrasonic measuring unit (USM) microcontroller 50, a host microcontroller 52, a metrology slash 54, and/or other suitable electronic components. Although not depicted, the metrology unit 28 may include a power source, such as a battery. Alternatively or additionally, the metrology unit 28 may include line power and/or may be powered in one or more other suitable manners (e.g., solar power, wind power, etc.)

The host microcontroller 52 may be in communication with the valve driver 48 and the USM microcontroller 50. For example, the host microcontroller 52 may be configured to send control signals to the valve driver 48 to open and/or close, or otherwise adjust, a gas valve 56 of the metrology unit 28 to facilitate causing a flow to flow through the flow tube 40.

The USM microcontroller 50 may be in communication with one or more flow sensors 58 configured to sense one or more measures indicative of a flow rate of flow through the flow tube 40. In some cases, the host microcontroller 52 may be configured to send control signals to the USM microcontroller 50 to receive flow sensor measurements from the USM microcontroller 50. Although not required, the control signal sent from the host microcontroller 52 to the USM microcontroller 50 may cause the USM microcontroller to initiate sensing measures related to the flow rate of a flow through the flow tube 40.

The host microcontroller 52 and the USM microcontroller 50 may be any suitable type of microcontroller. For the example the host microcontroller 52 and/or the USM microcontroller 50 may include a processor (e.g., the processor 20 and/or other suitable processor) and memory (e.g., the memory 18 and/or other suitable memory).

The host microcontroller 52 may be in communication with the temperature sensor 46. In response to receiving control signals and/or at one or more other suitable times, the temperature sensor 46 may send sensed measurements related to temperature to the host microcontroller 52. In some cases, the sensed temperature measurements may be related to a temperature of the flow through the flow tube 40 (e.g., a temperature sensed in the flow tube, a temperature sensed in the metrology housing 32, etc.) and may be used to adjust or correct flow rate data of flow through the flow tube 40.

The host microcontroller 52 may be in communication with the metrology pressure sensor 44. In response to receiving control signals and/or at one or more other suitable times, the metrology pressure sensor 44 may send sensed measurements related to pressure to the host microcontroller 52. In some cases, the sensed pressure measurements may be related to a pressure of the flow through the flow tube 40 (e.g., sensed pressure in the flow tube 40, a sensed pressure in a metrology housing 32, a net pressure, etc.)

The host microcontroller 52 may be in communication with the slash 54, which may store calculated values of flow rate of the flow through the gas line over time. In response to receiving control signals and/or at one or more other suitable times, the slash 54 may send summed values of flow rates over a predetermined time to the host microcontroller 52 for use in generating an average flow rate over the predetermined time period.

As discussed, the gas meter 10 may include the index unit 30. The index unit 30 may include one or more indexing PCBs 60 in communication with one or more electronic components of the index unit 30. For example, the indexing PCB 60 may include and/or be in communication with an index pressure sensor 62, an index power source 64, an antenna 66, a user interface 70, an optical communication interface 72, an electronic production interface 74, an index slash 76, an application microcontroller 78, and/or other suitable electronic components.

The power source 64 of the index unit 30 may be any suitable type of power source configured to power the index unit 30 and/or the metrology unit 28 when the metrology unit 28 does not include a power source. In some cases, the index power source 64 may be or include a battery. Alternatively or additionally, the power source 64 may be line power and/or may be one or more components configured to facilitate powering the index unit 30 in one or more other suitable manners (e.g., solar power, wind power, etc.)

The application microcontroller 78 may be in communication with the index pressure sensor 62. In response to receiving control signals and/or at one or more other suitable times, the pressure sensor 62 may send sensed measurements related to pressure to the application microcontroller 78. In some cases, the sensed pressure measurements may be related to an ambient pressure at the index unit 30. Further, although not required, values from the index pressure sensor 62 may be stored in the index slash 76.

In addition to storing the values from or related to the index pressure sensor 62, the application microcontroller 78 may be configured to store additional and/or alternative information in the slash 76. Other information that may be stored and/or retrieved in the slash 76 by the application microcontroller 78 may include, but is not limited to, alarm records, readings from other sensors (e.g., including readings from sensors of the metrology unit 28), calculations based on readings, and/or other suitable information.

The antenna 66, the user interface 70 (e.g., the user interface 22 and/or one or more other suitable user interfaces), the optical communication interface 72, and the electronic production interface may facilitate a public interface 80 (e.g., facilitate interactions with the gas meter 10 by local users, such as technicians or others, and/or remote users, such as users at the remote unit 12 and/or other remote units). The antenna 66 may be configured for any suitable wireless communication protocol including, but not limited to, Zigbee, Mbus, GMS, radio frequency (RF), near-field communication (NFC), Bluetooth, Bluetooth Low Energy (BLE), and/or other suitable communication protocols. The user interface 70 may be configured similar to or different than the user interface 22 discussed above. In some cases, the user interface 70 may include a display, one or more switches, one or more speakers for sounding alarms and/or for other purposes, and/or one or more other suitable components. In some instances, the optical communication interface 72 may be used by meter operators to obtain data from the gas meter 10, to change settings on the gas meter 10, to open the gas meter 10, and/or for one or more other suitable purposes. The electronic production interface 74 may be used during production of the gas meter 10 to initially configure the gas meter 10 and/or may be used for one or more other suitable purpose.

The metrology unit 28 and the index unit 30 may be configured to communicate with each other via a wired and/or wireless connection. In one example, as depicted in FIG. 3, the metrology unit 28 and the index unit 30 may communicate over a metrology communication interface (MCI) 82, which may extend from the metrology PCB 42 to the index PCB 60 and/or extend between components thereof. In some cases, the MCI 82 may extend from input/output ports of the metrology unit 28 that are coupled to a terminal block of the metrology unit 28 to input/output ports of the index unit 30 that are coupled to a terminal block of the index unit 30. In some cases, the terminal block of the metrology unit 28 may be releasably mechanically connected to the terminal block of the index unit 30 such that the index unit 30 may be releasably coupled to the metrology unit 28.

In some cases, the index unit 30 may communicate pressure sensed by the index pressure sensor 62 at the index unit 30 to the metrology unit 28 over the MCI 82. The metrology unit 28 may utilize values from the index pressure sensor 62 to determine a net pressure of the gas meter 10 by subtracting values from the index pressure sensor 62 from values of the metrology pressure sensor 44. The net pressure may be utilized to correct or adjust the flow rate values of the flow through the flow tube 40 for pressure changes.

Figure 4:
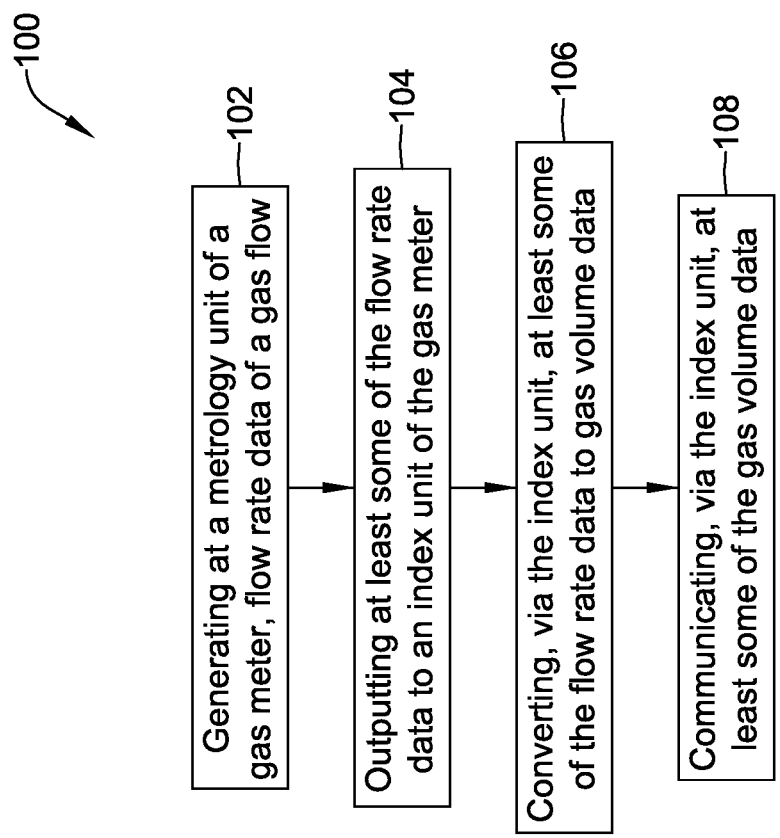
FIG. 4 is a schematic diagram of an illustrative method of operating a gas meter system, such as the gas metering system of FIG. 3.

FIG. 4 is a schematic flow diagram of an illustrative method 100 for providing and communicating volume data for a flow through a gas line (e.g., a gas flow through the gas line 6 and/or other suitable gas line). In some cases, the method 100 may be entirely or at least partially executed using a gas meter (e.g., the gas meter 10 and/or other suitable gas meter).

The method 100 may include generating 102 flow rate data of a gas flow. When executed using the gas meter 10, the flow rate data may be generated using a metrology unit (e.g., the metrology unit 28 and/or other suitable metrology units). In some cases, the flow rate data of the gas flow may be generated based on readings from a flow rate sensor (e.g., the flow rate sensors 58 and/or other suitable flow rate sensors) of the metrology unit taken at each of or over one or more predetermined times (e.g. at two (2) second increments and/or other suitable time increments). In one example, the generated flow rate data may be volumetric flow rate data and may be calculated based on Equations (1)-(3) discussed herein. Other techniques for determining flow rate data are contemplated, including, but not limited to, taking averages of flow rate values and compensating flow rate values (e.g., compensating for gas conditions, such as temperature and/or pressure). Although not required, the metrology unit may store the flow rate data, including times at which the flow rate is sampled, in memory (e.g., the memory 18, the slash 54, and/or at one or more other suitable locations including memory).

The method 100 may include outputting 104 at least some of the flow rate data from the metrology unit to an index unit (e.g., the index unit 30 and/or other suitable index unit) of the gas meter. The flow rate data may be outputted from the metrology unit to the index unit via one or more output ports (e.g., one or more ports associated with the MCI 82 and/or one or more other suitable ports). The ports may facilitate a wired and/or wireless communication between the metrology unit and the index unit.

Once the flow rate data has been received by the index unit, the index unit may convert 106 at least some of the flow rate data to gas volume data. As at least some of the flow rate data may be a volumetric flow rate data, it may be possible to determine gas volume data of gas delivered through the gas line over time based on the flow rate data and the period of time. The period of time may be a time since installation of the gas meter, since installation of the index unit, since a last gas volume reading, since the end of the last billing cycle, since the end of the last calendar or fiscal year, and/or other suitable time period.

In some cases and although not required, the gas meter may be specifically configured to have the index unit, rather than the metrology unit, generate the gas volume data. That is, in certain instances the metrology unit may not be configured to convert flow rate data to gas volume data. As generating and/or compensating the gas volume data may take energy and/or processing power, it may be advantageous to have a replaceable index unit do the power-intensive calculations involved with generating gas volume data rather than the metrology unit that is physically in communication with the gas line (e.g., the gas utility net) and is difficult to replace if its battery expires.

The method 100 may further include communicating 108, via the index unit, at least some of the gas volume data. In addition to or as an alternative to communicating gas volume data, the flow rate data outputted to the index unit and/or other suitable flow rate data may be communicated. In some cases, the gas volume data may be communicated to a remote unit (e.g., a head-end system for a utility, a remote household unit for viewing gas flow rate and/or gas volume data, remote server, etc.) in communication with the gas meter.

The gas volume data may be communicated over one or more networks. The one or more networks may be wired and/or wireless networks. The one or more networks may include at least one of a WAN, a LAN, and a HAN, among other suitable networks. The ability of the index unit to communicate gas volume data over a WAN may allow for communication of such data to a head-end system and/or a remote-server for access by computing systems of users and/or utilities.

In some cases, the index unit may be configured to display the gas volume data on a screen of a user interface (e.g., the user interface 70 and/or other suitable user interface). Similarly, the index unit may able configured to display received flow rate data, relevant time periods, and/or other data on the screen of the user interface.

Figure 5:
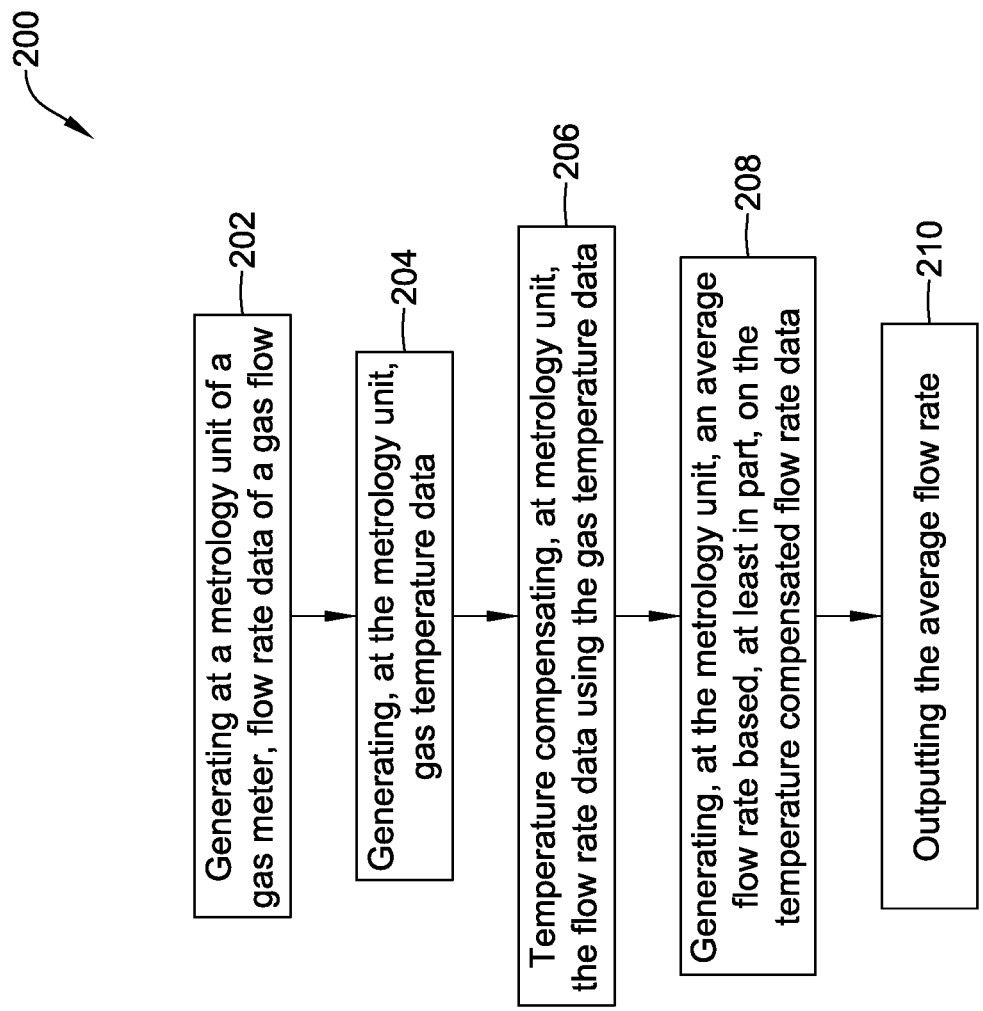
FIG. 5 is a schematic diagram of an illustrative method of operating a gas meter system, such as the gas metering system of FIG. 3.

FIG. 5 depicts a method 200 of generating and outputting flow rate data. In some cases, the method 200 of generating and outputting flow rate data may be implemented with a metrology unit (e.g., the metrology unit 28 and/or other suitable metrology unit) of a gas meter (e.g., the gas meter 10 and/or other suitable gas meter) connected to a gas line network, where the metrology is in communication with and releasably connectable to an index unit (e.g., the index unit 30 and/or other suitable index unit) of the gas meter. The metrology unit may be battery powered, but this is not required.

The illustrative method 200 may include generating 202 flow rate data of a gas flow. The generating 202 flow rate data of the gas flow may be performed in a manner similar to or different than generating 102 flow rate data of the illustrative method 100. For example, when executed using the gas meter, the flow rate data may be generated using the metrology unit. In some cases, the flow rate data of the gas flow may be generated based on readings from a flow rate sensor (e.g., the flow rate sensors 58 and/or other suitable flow rate sensors) of the metrology unit taken at each of or over one or more predetermined times (e.g. at two (2) second increments and/or other suitable time increments). In one example, the generated flow rate data may be volumetric flow rate data and may be calculated based on Equations (1)-(3) discussed herein. Other techniques for determining flow rate data are contemplated, including, but not limited to, taking averages of flow rate values and compensating flow rate values (e.g., compensating for gas conditions or characteristics including, but not limited to temperature and/or pressure). Although not required, the metrology unit may store the flow rate data, including times at which the flow rate is sampled, in memory (e.g., the memory 18, the slash 54, and/or at one or more other suitable location including memory).

In addition to generating flow rate data, gas temperature data may be generated 204 at the metrology unit. The gas temperature data may be obtained from a temperature sensor (e.g., the temperature sensor 46 and/or other suitable temperature sensor) within a housing (e.g., the metrology housing 32 and/or other suitable housing) of the metrology unit and/or within a flow tube (e.g., the flow tube 40 or other suitable flow tube) in communication with the gas flow being sensed. Although not required, the metrology unit may store the gas temperature data, including times at which the flow rate is sampled, in memory.

Once the flow rate data and gas temperature data have been generated, the method 200 may include temperature compensating 206 the flow rate data using the gas temperature data. For example, flow rate data reading may be temperature compensated using temperature data corresponding to times at which the flow rate data was taken. A formula or table may be stored in the metrology unit that defines a known relationship between gas flow rate and gas temperature. An uncompensated flow rate and a gas temperature may be received as independent variables and the relationship may be used to generate a corresponding temperature compensated flow rate. In some cases, the temperature compensation of the flow rate data may occur at the metrology unit. In one example, a processor or controller (e.g., the host microcontroller 52, the USM microcontroller 50, and/or other suitable microcontrollers and/or processors) of the metrology unit may compensate the generated flow rate data using the generated temperature data. Although not required, the metrology unit may store the temperature compensated flow rate data in memory.

In addition to or as an alternative to being temperature compensated, the generated flow rate data may be pressure compensated. For example, gas pressure data may be determined from readings of one or both of the pressure sensor in the metrology unit (e.g., the pressure sensor 44 and/or other suitable pressure sensors) and the pressure sensor in the index unit (e.g., the pressure sensor 62 and/or other suitable pressure sensors) and may be used to compensate each of flow rate data readings using pressure data corresponding to times at which the flow rate data was taken. In some cases, the pressure compensating of the flow rate data may occur at the metrology unit. In one example, a processor or controller of the metrology unit may compensate the generated flow rate data using the generated pressure data. In another example, a processor or controller of the index unit may compensate the generated flow rate data using the generated pressure data. In another example, a processor or controller of the index unit and a processor or controller of the metrology unit may jointly compensate the generated flow rate data using the generated pressure data. Although not required, the metrology unit may store the gas temperature and/or pressure compensated data in memory.

Once the compensated flow rate data has been determined or generated, an average flow rate value of the gas line may be generated 208. In one example, a processor or controller of the metrology unit may determine an average flow rate for one or more set or predetermined periods of time using the raw flow rate data and/or compensated flow rate data. The average flow rate may be generated for a plurality of set or predetermined periods of time. The periods of time may be a minute, an hour, a day, a week, a month, a year, a time since installation of the gas meter, since installation of the index unit, since a last gas volume reading, since the end of the last billing cycle, since the end of the last calendar or fiscal year, and/or other suitable time period.

Although not required, the metrology unit may store the average flow rate data in memory at the metrology unit and/or at one or more other suitable locations. Storing the flow rate data (e.g., which may include average flow rate data, gas temperature and pressure compensated flow rate data, and/or other flow rate data) at the metrology unit rather than on the index unit may facilitate replacing the index unit without having to download metrology data from the gas meter and then upload the metrology data to the new index unit.

The average flow rate values may be calculated in any suitable manner. In one example, generating the average flow rate over the predetermined period may include accumulating a number of individual readings from the flow sensor of the metrology unit over the predetermined time period, which may result in an accumulated flow rate value. Then, the accumulated flow rate value may be divided by the number of the plurality of readings that were accumulated over the predetermined period of time to generate the average flow rate over the predetermined period of time.

The metrology unit may be configured to generate the average flow rate over the predetermined time period, and may deliver the average flow rate in response to receiving a request originating external to the metrology unit (e.g. originating in the index unit). In some cases, the request may specify the predetermined time period(s).

After determining the average flow rate for one or more predetermined periods of time, the metrology unit may output 210 the average flow data. For example, the metrology unit may output the average flow rate data to the index unit of the gas meter, to a user interface (e.g., the user interface 70 and/or other suitable user interface), and/or to one or more other suitable local and/or remote computing devices or components. When outputting the average flow rate data to the index unit, the metrology unit may output the data over a wired or wireless connection with the index unit.

The metrology unit may be configured to output the flow rate data (e.g., the average flow rate values and/or other suitable flow rate data) at any suitable time. For example, the metrology unit may be configured to output the flow rate data (e.g., to the index unit and/or other suitable computing device) upon receiving a request originating external to the metrology unit (e.g., from the index unit and/or other suitable computing device), at one or more predetermined times (e.g., due to a setting of the gas meter), and/or at one or more other suitable times.

Further, when the index unit receives the generated average flow rates, the index unit may use this value for any suitable purpose. For example, the index unit may use the received average flow rate to generated gas volume data, display the average flow rate on a screen, output the average flow rate to a remote unit (e.g., the remote unit 12, remote server, and/or other suitable remote units), etc. Although FIGS. 4 and 5 depict various illustrative methods for generating data and communicating data, others are contemplated.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method comprising:
    generating, at a metrology unit of a gas meter, flow rate data of a gas flow based on readings from a flow rate sensor of the metrology unit;
    generating, at the metrology unit, an average flow rate over a predetermined period of time based at least in part on the flow rate data, wherein generating the average flow rate over the predetermined period of time includes:
        accumulating a number of the readings from the flow rate sensor of the metrology unit over the predetermined period of time, resulting in an accumulated flow rate value; and
        dividing the accumulated flow rate value by the number of readings that were accumulated over the predetermined period of time to generate the average flow rate over the predetermined period of time; and
    outputting, via an output port of the metrology unit, the average flow rate over the predetermined period of time.

2. The method of claim 1, further comprising:
    receiving a request originating external to the metrology unit, and in response to the received request, the metrology unit sending the average flow rate over the predetermined period of time.

3. The method of claim 2, wherein the request is received from an index unit of the gas meter, wherein the index unit is releasably and communicatively coupled to the metrology unit.

4. The method of claim 3, further comprising:
    generating, at the metrology unit, gas temperature data of the gas flow based on readings from a gas temperature sensor of the metrology unit;
    temperature compensating, at the metrology unit, the flow rate data using the gas temperature data to produce temperature compensated flow rate data, wherein the temperature compensated flow rate data is used to generate the average flow rate over the predetermined time; and
    calculating, at the index unit, temperature compensated gas volume data based at least in part on the average flow rate over the predetermined period of time.

5. The method of claim 4, further comprising:
    sending, via an output port of the index unit, at least some of one or both of the temperature compensated gas volume data and the temperature compensated flow rate data to a remote server.

6. The method of claim 1, wherein each of the readings from the flow rate sensor is temperature compensated using corresponding gas temperature data.

7. The method of claim 1, further comprising:
    generating, at the metrology unit, an average flow rate for each of a plurality of predetermined periods of time based at least in part on the flow rate data; and
    outputting, via an output port of the metrology unit, the average flow rate for at least some of the plurality of predetermined periods of time.

8. The method of claim 7, wherein the plurality of predetermined periods of time comprises two or more of a minute, an hour, a day, a week, a month, a year, and the overall time from installation.

9. The method of claim 1, wherein the output port of the metrology unit is coupled to a terminal block of the metrology unit, and wherein the terminal block of the metrology unit is releasably coupled to a terminal block of an index unit of the gas meter, wherein the index unit is releasably coupled to the metrology unit.

10. The method of claim 1, wherein the output port of the metrology unit is configured to communicate via a connection with an index unit of the gas meter, wherein the index unit is releasably coupled to the metrology unit.

11. The method of claim 1, wherein the output port of the metrology unit is configured to communicate with an index unit of the gas meter, wherein the index unit is releasably coupled to the metrology unit and comprises an external communication port for communicating with a gas utility over a wide area network (WAN).

12. A method comprising:
  generating, at a metrology unit of a gas meter, flow rate data of a gas flow based on readings from a flow rate sensor of the metrology unit;
  generating, at the metrology unit, an average flow rate value of the gas flow based on the flow rate data;
  outputting, via an output port of the metrology unit, the average flow rate value to an index unit of the gas meter, wherein the index unit is releasably coupled to the metrology unit;
  converting, via the index unit, at least some of the flow rate data received from the metrology unit to gas volume data;
  communicating, via the index unit, at least some of the gas volume data over a network; and
  wherein the metrology unit of the gas meter is not configured to convert the flow rate data into gas volume data.

13. The method of claim 12, wherein the flow rate data generated by the metrology unit includes average flow rate data over each of a plurality of periods of time.

14. The method of claim 12, wherein at least some of the flow rate data generated by the metrology unit is temperature compensated.

15. A system comprising:
  a first unit comprising:
    a flow tube configured to receive flow from a flow line;
    a sensing device in communication with the flow in the flow tube;
    a controller in communication with the sensing device;
  a second unit releasably and communicatively coupled to the first unit, the second unit is configured to communicate with a remote unit;
  wherein the first unit is configured to:
    determine one or more values related to flow rate of the flow through the flow tube based on an output of the sensing device; and
    provide a value of the one or more values related to flow rate to the second unit upon request; and
  wherein the first unit is not configured to convert the flow rate data into gas volume data and provide the gas volume data to the second unit upon request.

16. The system of claim 15, wherein determining one or more values related to the flow rate of the flow through the flow tube comprises:
  determining a flow rate from the output of the sensing device;
  adjusting the flow rate based on gas conditions;
  calculating an average flow rate over a predetermined time period; and
  storing the average flow rate in memory.

17. The system of claim 15, wherein the second unit is configured to receive the value of the one or more values related to the flow rate and determine a value of a volume of flow through the flow tube.

18. The system of claim 15, wherein the first unit is a gas metrology unit, the second unit is an indexing unit, and the remote unit is a utility server.

* * * * *